(12) United States Patent
Pan et al.

(10) Patent No.: US 7,054,300 B2
(45) Date of Patent: *May 30, 2006

(54) SINGLE USER DETECTION CIRCUIT

(75) Inventors: Jung-Lin Pan, Selden, NY (US); Parthapratim De, Camp Bell, CA (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 26 days.

This patent is subject to a terminal disclaimer.

(21) Appl. No.: 11/100,901

(22) Filed: Apr. 7, 2005

(65) Prior Publication Data

US 2005/0180495 A1  Aug. 18, 2005

Related U.S. Application Data

(63) Continuation of application No. 10/077,527, filed on Feb. 15, 2002, now Pat. No. 6,904,036, which is a continuation of application No. 09/814,346, filed on Mar. 22, 2001, now Pat. No. 6,885,654.

(60) Provisional application No. 60/266,932, filed on Feb. 6, 2001, provisional application No. 60/268,587, filed on Feb. 15, 2001.

(51) Int. Cl.
  *H04B 7/216* (2006.01)
(52) U.S. Cl. .................. 370/342; 370/210; 370/335; 370/441; 375/147
(58) Field of Classification Search ............. 370/206, 370/210–211, 335, 320, 342, 441, 321, 337, 370/442, 146–147; 375/146, 147
See application file for complete search history.

(56) References Cited

U.S. PATENT DOCUMENTS

| 5,719,899 | A | 2/1998 | Thielecke et al. |
| 5,790,537 | A | 8/1998 | Yoon et al. |
| 6,590,889 | B1 | 7/2003 | Preuss et al. |
| 6,608,859 | B1 | 8/2003 | De et al. |
| 6,625,203 | B1 | 9/2003 | De et al. |
| 6,798,850 | B1 * | 9/2004 | Wedin et al. ............ 375/340 |
| 6,873,596 | B1 * | 3/2005 | Zhang et al. ............ 370/210 |
| 6,885,654 | B1 * | 4/2005 | Pan et al. ................ 370/342 |

FOREIGN PATENT DOCUMENTS

WO   99/40698   11/1998

OTHER PUBLICATIONS

Bini, "Toeplizt Matrices, Algorithms and Applications", ERICIM News, Jul. 1995.

(Continued)

*Primary Examiner*—Ajit Patel
*Assistant Examiner*—Steven A Blount
(74) *Attorney, Agent, or Firm*—Volpe and Koenig, P.C.

(57) ABSTRACT

A circuit for use in a receiver receives a plurality of code division multiple access data signals simultaneously. Each data signal experiences a similar channel response. The circuit receives a combined signal over the shared spectrum in a time slot. The combined signal comprises the plurality of data signals. The combined signal is sampled at a multiple of a chip rate of the combined signal. The similar channel response is estimated. A channel response matrix or a channel correlation matrix is constructed based in part on the estimated channel response. A spread data vector is determined based in part on a fast Fourier transform (FFT) decomposition of a circulant version of the channel response matrix or channel correlation matrix. The spread data vector is despread to recover data from the matrix.

8 Claims, 9 Drawing Sheets

OTHER PUBLICATIONS

Circulant Matrices, http://www.mai.liu.se/~evlun/pub/lic/mode9.html.

Fast Matrix-Vector Multiplication for Structured Matrices, http://www.cs.utk.edu/~dongarra/etemplates/node384.html.

Toeplitz Matrix, http://planetmath.org/encyclopedia/ToeplitzMatrix.html.

Benvenuto et al., "Joint Detection with Low Computational Complexity for Hybrid TD-CDMA Systems", VTC, Fall 1999, IEEE VTS 50$^{th}$, Vehicular Technology Conference, Amsterdam, Sep. 19, 1999, IEEE Vehicular Technology Conference, New York, NY IEEE U.S., vol. 1 Conf. 50, pp. 618-622.

Klein et al., "Zero Forcing and Minimum Mean-Square-Error Equalization for Multiuser Detection in Code-Division Multiple-Access Channels", IEEE Transactions on Vehicular Technology, vol. 45, No. 2, May 1996.

Klein, "Data Detection Algorithms Specially Designed for the Downlink of CDMA Mobile Radio Systems", IEEE 47$^{th}$ Vehicular Technology Conference, Phoenix, Arizona, May 4-7, 1997.

Karimi et al., "A Novel and Efficient Solution to Block-Based Joint-Detection Using Approximate Cholesky Factorization", Motorola GSM Products Division, Swindon, UK, 1998.

PA Consulting Group/Racal Instruments Ltd., "Low Cost MMSE-BLE-SD Algorithm for UTRA TDD Mode Downlink", ETSI STC SMG2 Layer 1 Expert Group, Helsinki, Finland 8-11$^{th}$ Sep. 1998.

Klein et al., "Linear Unbiased Data Estimation in Mobile Radio Systems Applying CDMA", IEEE Journal on Selected Areas in Communications, vol. 11, No. 7, Sep. 1993.

* cited by examiner

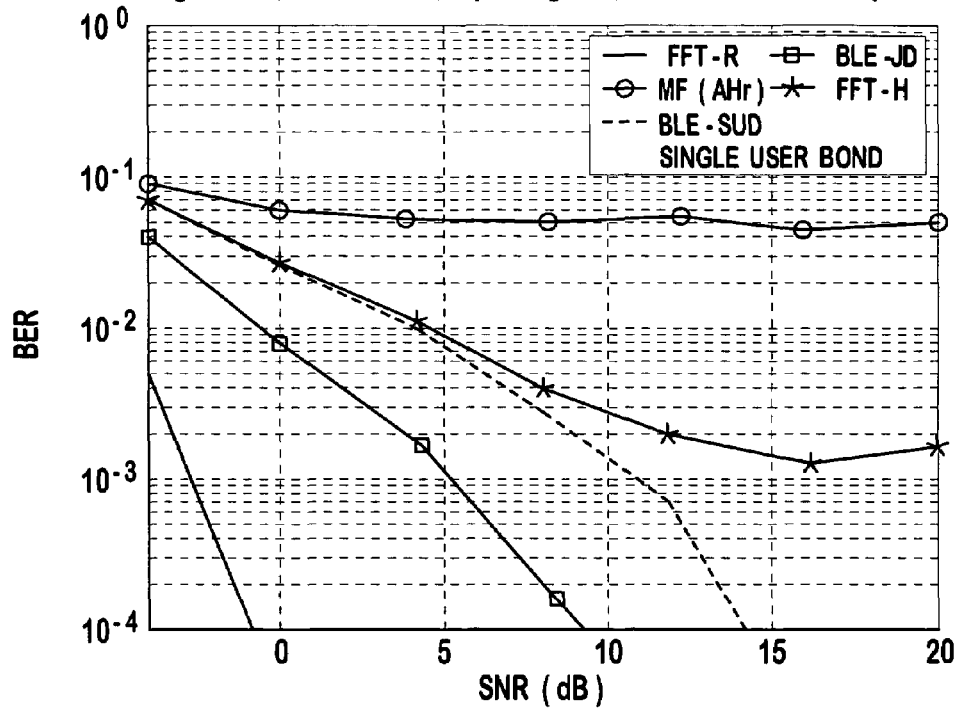
FIG. 7 tddWg4Case3, commonCh, EqualAvgPwr, 12 codes with txGrpSize of 1
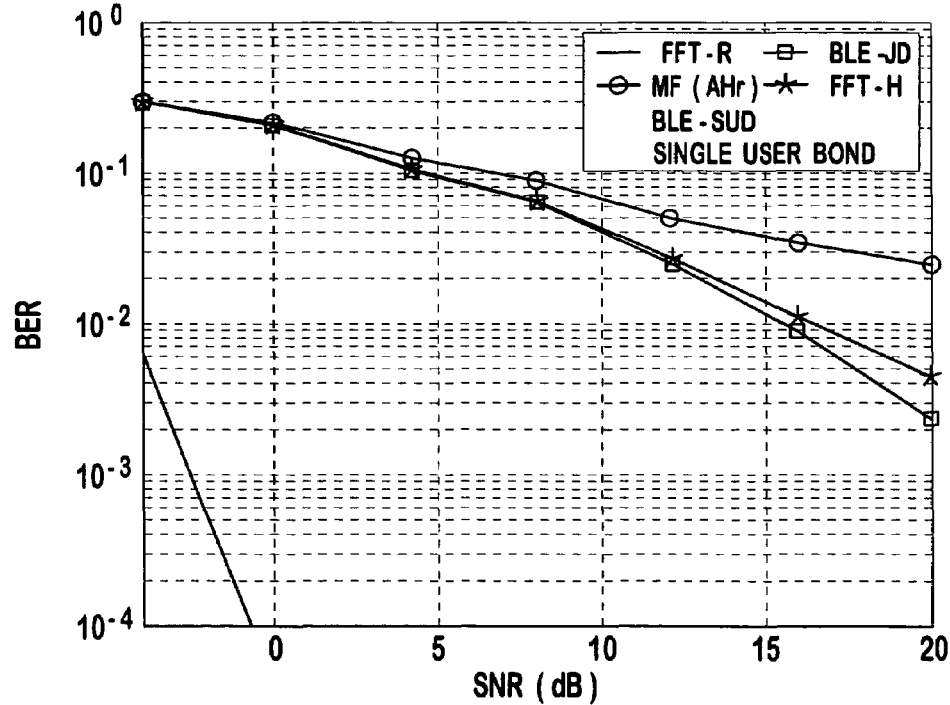
FIG. 8 tddWg4Case1, commonCh, EqualAvgPwr, 1 codes with txGrpSize of 1

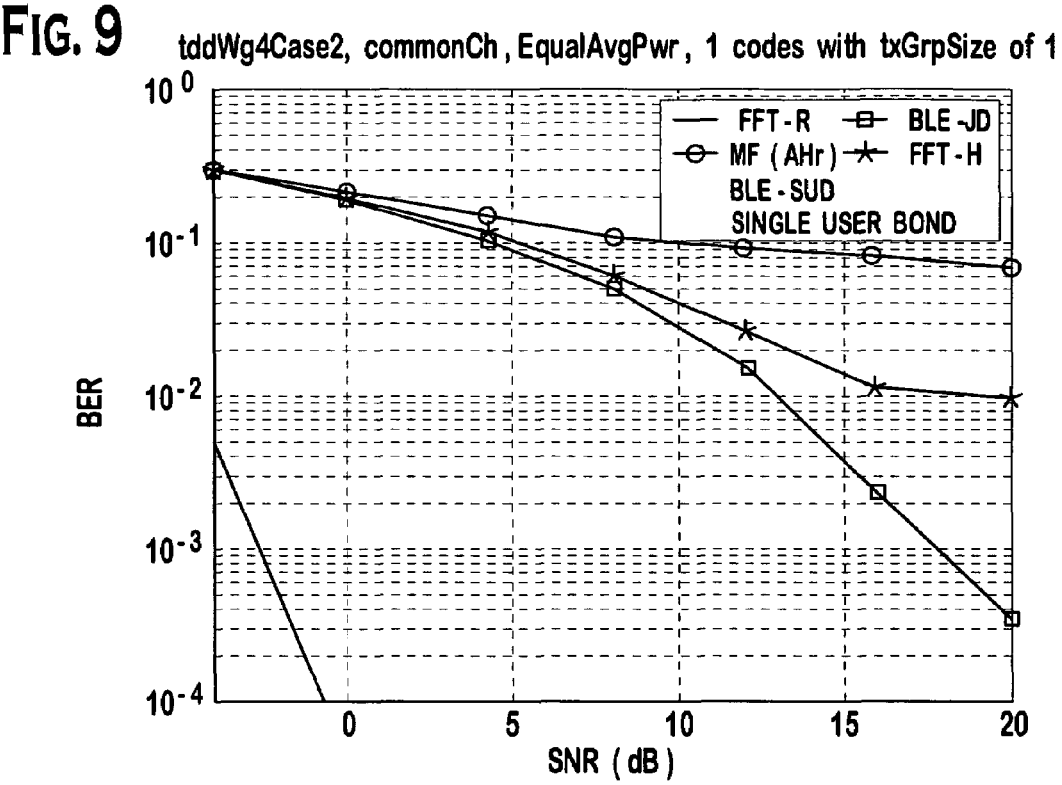
FIG. 9 tddWg4Case2, commonCh, EqualAvgPwr, 1 codes with txGrpSize of 1
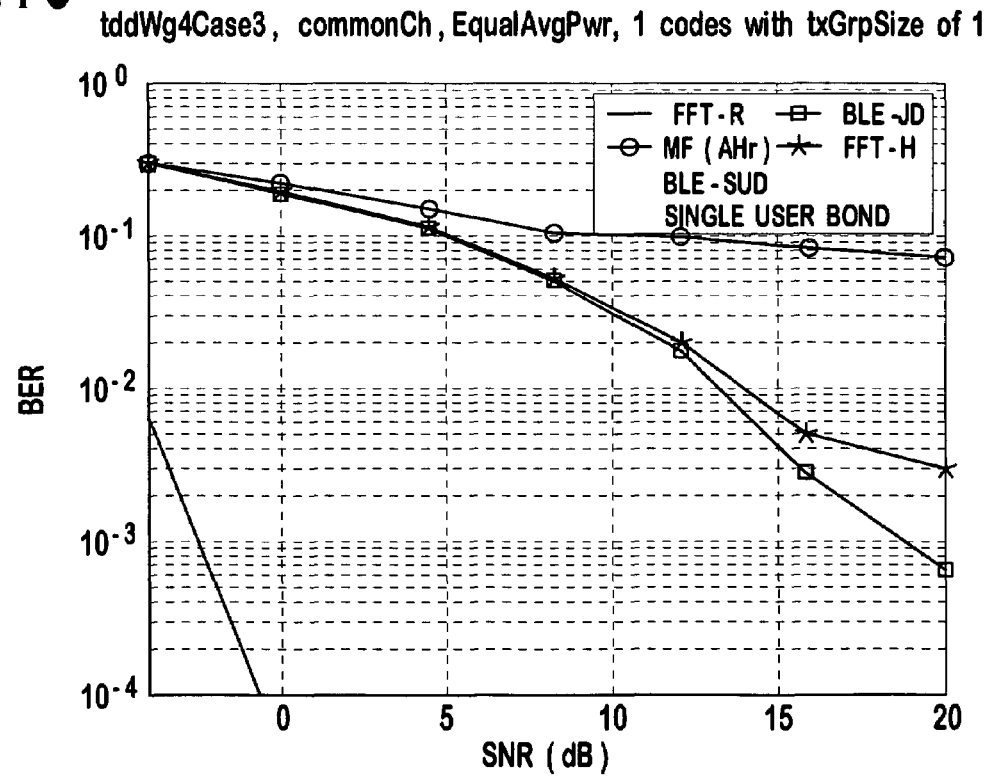
FIG. 10 tddWg4Case3, commonCh, EqualAvgPwr, 1 codes with txGrpSize of 1

SINGLE USER DETECTION CIRCUIT

CROSS REFERENCE TO RELATED APPLICATIONS

This application is a continuation of U.S. patent application Ser. No. 10/077,527, filed Feb. 15, 2002, now U.S. Pat. No. 6,904,036 which is a continuation of U.S. patent application Ser. No. 09/814,346, filed Mar. 22, 2001, now U.S. Pat. No. 6,885,654 which claims priority from U.S. Provisional Patent Application No. 60/266,932, filed Feb. 6, 2001 and U.S. Provisional Patent Application No. 60/268,587, filed Feb. 15, 2001, incorporated by reference as if set forth.

BACKGROUND

The invention generally relates to wireless communication systems. In particular, the invention relates to data detection in a wireless communication system.

Figure 1:
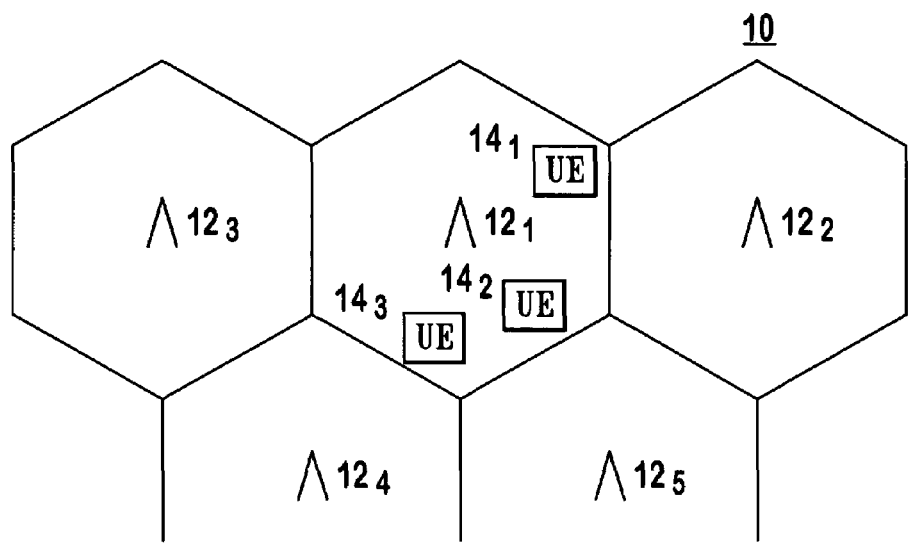

FIG. 1 is an illustration of a wireless communication system 10. The communication system 10 has base stations $12_1$ to $12_5$ which communicate with base stations $14_1$ to $14_3$. Each base station $12_1$ has an associated operational area, where it communicates with UEs $14_1$ to $14_3$ in its operational area.

In some communication systems, such as code division multiple access (CDMA) and time division duplex using code division multiple access (TDD/CDMA), multiple communications are sent over the same frequency spectrum. These communications are differentiated by their channelization codes. To more efficiently use the frequency spectrum, TDD/CDMA communication systems use repeating frames divided into time slots for communication. A communication sent in such a system will have one or multiple associated codes and time slots assigned to it. The use of one code in one time slot is referred to as a resource unit.

Since multiple communications may be sent in the same frequency spectrum and at the same time, a receiver in such a system must distinguish between the multiple communications. One approach to detecting such signals is multiuser detection. In multiuser detection, signals associated with all the UEs $14_1$ to $14_3$, users, are detected simultaneously. Approaches for implementing multiuser detection include block linear equalization based joint detection (BLE-JD) using a Cholesky or an approximate Cholesky decomposition.

Another approach is single user detection. In single user detection, data is only recovered for a single user (one UE $14_1$). Based on the application, the single user detected data may have been sent using one or multiple codes. Approaches for implementing single user detection include block linear equalization using a Cholesky or an approximate Cholesky decomposition. These approaches have a high complexity. The high complexity leads to increased power consumption, which at the UE $14_1$ results in reduced battery life. Accordingly, it is desirable to have alternate approaches to detecting received data.

SUMMARY

A circuit for use in a receiver receives a plurality of code division multiple access data signals simultaneously. Each data signal experiences a similar channel response. The circuit receives a combined signal over the shared spectrum in a time slot. The combined signal comprises the plurality of data signals. The combined signal is sampled at a multiple of a chip rate of the combined signal. The similar channel response is estimated. A channel response matrix or a channel correlation matrix is constructed based in part on the estimated channel response. A spread data vector is determined based in part on a fast Fourier transform (FFT) decomposition of a circulant version of the channel response matrix or channel correlation matrix. The spread data vector is despread to recover data from the matrix.

BRIEF DESCRIPTION OF THE DRAWING(S)

Figure 3:
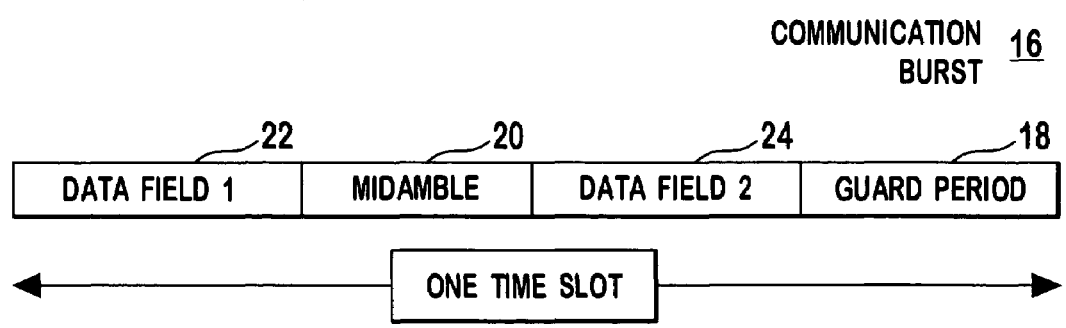
Figure 2:
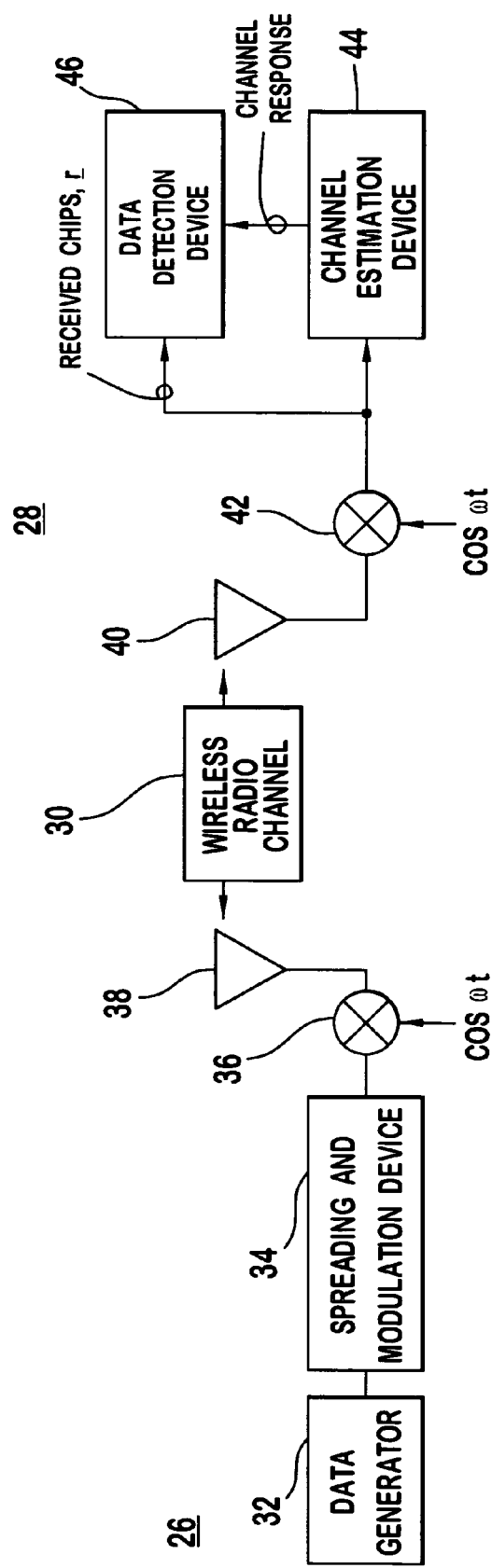
Figure 4:
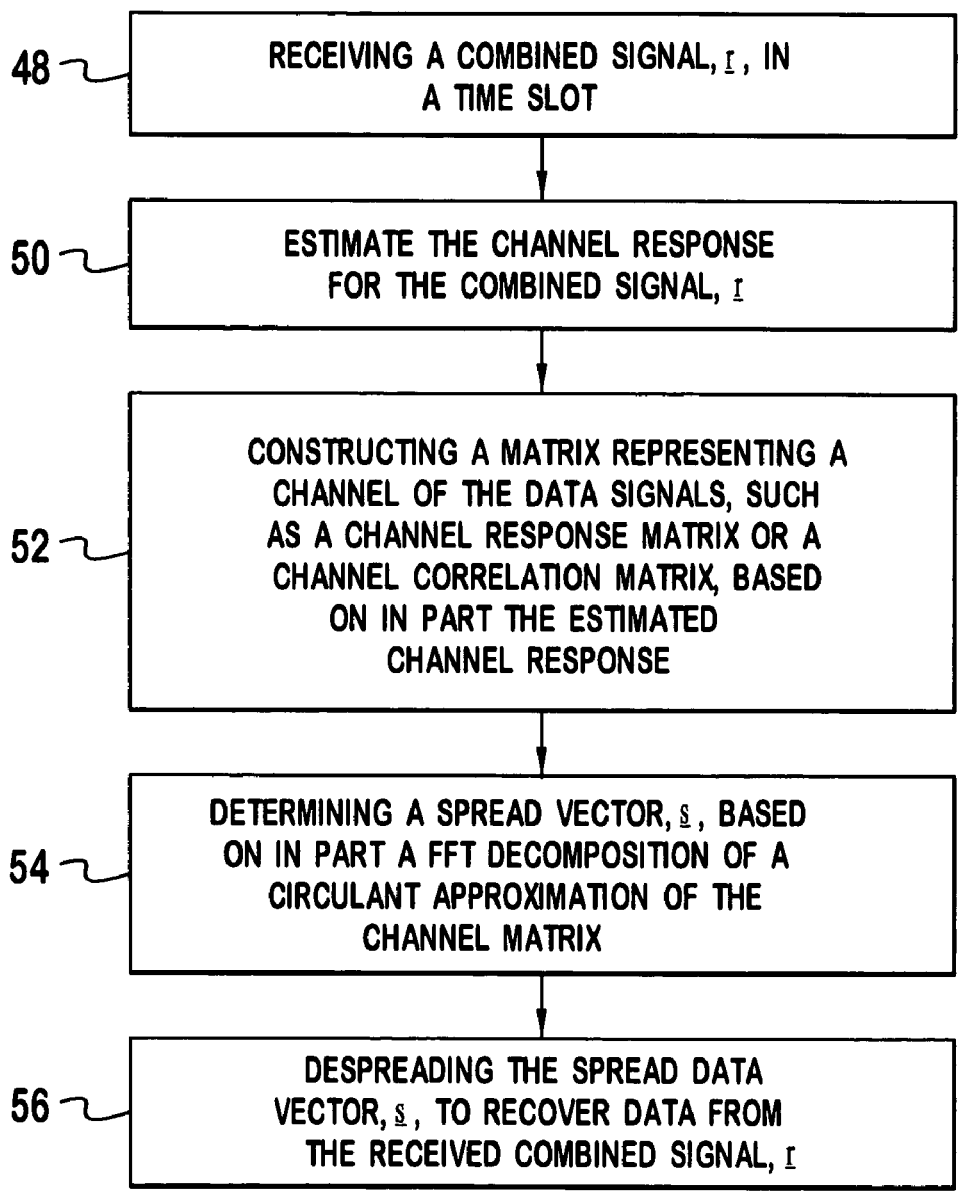
Figure 5:
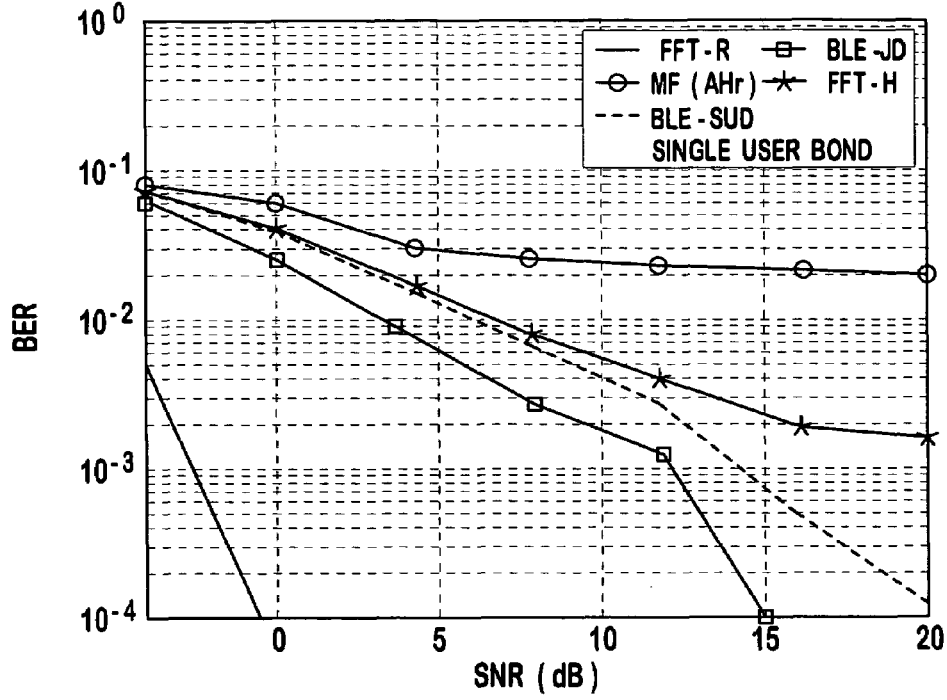
Figure 6:
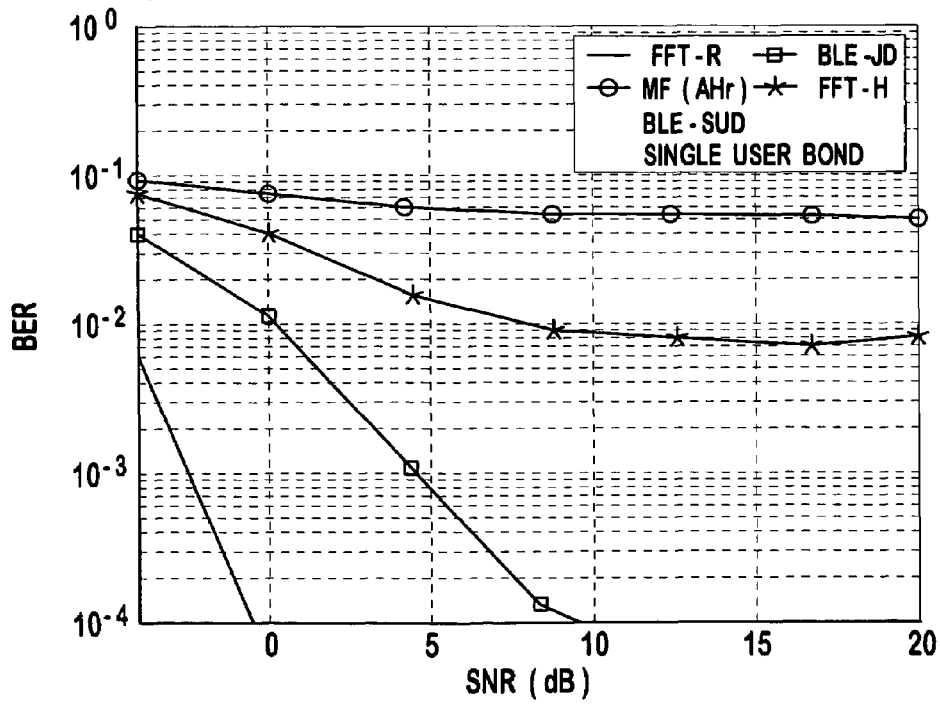

FIG. 1 is a wireless communication system.
FIG. 2 is a simplified transmitter and a single user detection receiver.
FIG. 3 is an illustration of a communication burst.
FIG. 4 is a flowchart of low complexity data detection.
FIGS. 5–15 are graphs of the performance of low complexity data detection.

DETAILED DESCRIPTION OF THE PREFERRED EMBODIMENT(S)

FIG. 2 illustrates a simplified transmitter 26 and receiver 28 using low complexity data detection in a TDD/CDMA communication system. In a typical system, a transmitter 26 is in each UE $14_1$ to $14_3$ and multiple transmitting circuits 26 sending multiple communications are in each base station $12_1$ to $12_5$. The low complexity data detector receiver 28 may be at a base station $12_1$, UEs $14_1$ to $14_3$ or both. The receiver 28 can be used at a UE $14_1$ for either multiuser or single user detection of a medium to high data rate service, such as a 2 megabits per second (Mbs). The receiver 28 can also be used at a base station $12_1$, when only a single UE $14_1$ transmits in a time slot.

The transmitter 26 sends data over a wireless radio channel 30. A data generator 32 in the transmitter 26 generates data to be communicated to the receiver 28. A modulation/spreading sequence insertion device 34 spreads the data and makes the spread reference data time-multiplexed with a midamble training sequence in the appropriate assigned time slot and codes for spreading the data, producing a communication burst or bursts.

A typical communication burst 16 has a midamble 20, a guard period 18 and two data bursts 22,24, as shown in FIG. 3. The midamble 20 separates the two data bursts 22,24 and the guard period 18 separates the communication bursts to allow for the difference in arrival times of bursts transmitted from different transmitters 26. The two data bursts 22, 24 contain the communication burst's data.

The communication burst(s) are modulated by a modulator 36 to radio frequency (RF). An antenna 38 radiates the RF signal through the wireless radio channel 30 to an antenna 40 of the receiver 28. The type of modulation used for the transmitted communication can be any of those known to those skilled in the art, such as quadrature phase shift keying (QPSK) or an N-ary quadrature amplitude modulation (QAM).

The antenna 40 of the receiver 28 receives various radio frequency signals. The received signals are demodulated by a demodulator 42 to produce a baseband signal. The baseband signal is processed, such as by a channel estimation device 44 and a low complexity data detection device 46, in the time slot and with the appropriate codes assigned to the received bursts. The channel estimation device 44 uses the midamble training sequence component in the baseband signal to provide channel information, such as channel impulse responses. The channel information is used by the data detection device 46 to estimate the transmitted data of the received communication bursts as hard symbols.

The data detection device 46 uses the channel information provided by the channel estimation device 44 and the known spreading codes used by the transmitter 26 to estimate the data of the desired received communication burst(s). Low complexity data detection is explained in conjunction with the flowchart of FIG. 4. Although low complexity data detection is explained using the third generation partnership project (3GPP) universal terrestrial radio access (UTRA) TDD system as the underlying communication system, it is applicable to other systems. That system is a direct sequence wideband CDMA (W-CDMA) system, where the uplink and downlink transmissions are confined to mutually exclusive time slots.

The receiver 28 receives using its antenna 40 a total of K bursts that arrive simultaneously, 48. The K bursts are superimposed on top of each other in one observation interval. Some or all of the K bursts may arise from or go to the same users for higher data rate services. For the 3GPP UTRA TDD system, each data field of a time slot corresponds to one observation interval.

A $k^{th}$ burst of the K bursts uses a code of $\underline{C}^{(k)}$ of length Q chips to spread each of its $N_s$ symbols to yield a sequence of length $Q \cdot N_s$ chips. The $k^{th}$ burst passes through a channel with a known or estimated channel response, $h^{(k)}$ of length W chips to form a chip sequence of length, $N_c=(SF \cdot N_s+W-1)$. SF is the spreading factor. Since uplink signals may originate from multiple UEs 14₁ to 14₃ each $h^{(k)}$ in the uplink may be distinct. For the downlink in the absence of transmit diversity, all bursts pass through the same channel and have the same $h^{(k)}$. At the receiver 28, the bursts from all users arrive superimposed as a single received vector, r. Some or all of the K bursts may be part of a multi-code transmission. The multi-codes have the same $h^{(k)}$, because they originate from the same transmitter 26.

The multi-user signal model consists of $N_c$ known received chips and $K \cdot N_s$ unknown information bearing symbols. The symbol response, $s^{(k)}$, of the $k^{th}$ burst is the convolution of $\underline{C}^{(k)}$ with $h^{(k)}$. Accordingly, $s^{(k)}$ is of length (SF+W−1) chips. W is the impulse response, which represents the trail of chips left by a unity symbol. The $N_s$ unknown symbols of the $k^{th}$ burst form a column vector $d^{(k)} \cdot r^{(k)}$ is the contribution of the $k^{th}$ burst to the overall received chip vector, $r \cdot d^{(k)}$ is the data vector for the $k^{th}$ burst. $d^{(k)}$ and $r^{(k)}$ are related by Equation 1.

$$r^{(k)}=A^{(k)}d^{(k)}, \text{ where } k=1 \ldots K \quad \text{Equation 1}$$

$A^{(k)}$ is the channel response matrix for the $k^{th}$ burst, which is an $N_c \times N_s$ matrix whose $j^{th}$ column is the symbol-response of the element of $d^{(k)}$. Assuming a time-invariant symbol-response, each column of $A^{(k)}$ has the same support, $s^{(k)}$, and successive columns are zero-padded and shifted versions of the first column. The overall, chip-rate, received vector is per Equation 2.

$$\underline{r} = \sum_{i=1}^{K} \underline{r}^{(k)} + \underline{n} \quad \text{Equation 2}$$

n is a zero-mean noise vector with independent identical distribution (i.i.d.) components of the variance, $\sigma^2$. Equation 2 becomes Equation 3, when written as a single matrix equation.

$$r=Ad+n \quad \text{Equation 3}$$

A is the overall channel response matrix, which is a matrix of size $N_c \times K \cdot N_s$. d is the data vector, which is a column vector of length $K \cdot N_s$. Equation 2 and Equation 3 model the inter-symbol interference (ISI) and multiple-access interference (MAI) in the received vector, r.

The signal models of Equations 1, 2 and 3 are formulated for chip rate sampling, such as 3.84 Mega chips per second (Mcps) in 3GPP UTRA system. For increased statistical accuracy, a receiver 28 may use over-sampling, such as a multiple chip rate sampling. A typical multiple chip rate sampling is twice the chip rate, although other multiples may be used. When using multiple chip rate sampling, the received signal burst will be over-sampled generating multiple sampled sequences. Each sequence is sampled at the chip rate with different time offsets with respect to one another. The $k^{th}$ burst passes through a channel with a known or estimated channel response, $h_m^{(k)}$, for the $m^{th}$ sampled sequence. $r_m^{(k)}$ is the contribution of the $k^{th}$ burst to the $m^{th}$ overall sampled chip vector, $r_m$. The data symbol vectors $d^{(k)}$ and the $m^{th}$ sampled chip vector $r_m^{(k)}$ are related by Equation 4.

$$r_m^{(k)}=A_m^{(k)}d^{(k)}, k=1 \ldots K, m=1 \ldots M \quad \text{Equation 4}$$

$A_m^{(k)}$ is the symbol response matrix for the $m^{th}$ sequence. It is a matrix of size $N_c \times N_s$, whose $j^{th}$ column is the $m^{th}$ sampled symbol-response of the $j^{th}$ element of $d^{(k)}$.

Equation 5 is the overall, chip-rate, received vector, $r_m$, of the $m^{th}$ sampled sequence.

$$\underline{r}_m = \sum_{i=1}^{K} \underline{r}_m^{(k)} + \underline{n} \quad m = 1 \ldots M \quad \text{Equation 5}$$

For an M multiple of chip rate sampling, a single matrix expression is per Equation 6.

$$r'=A'd+n \quad \text{Equation 6}$$

r' is the received signal vector and is defined as per Equation 7.

$$\underline{r}' = \begin{bmatrix} \underline{r}_1 \\ \underline{r}_2 \\ \vdots \\ \underline{r}_M \end{bmatrix} \quad \text{Equation 7}$$

A' is defined as per Equation 8.

$$A' = \begin{bmatrix} A_1 \\ A_2 \\ \vdots \\ A_M \end{bmatrix} \quad \text{Equation 8}$$

Equation 9 is Equation 6 rewritten as a summation form of K bursts.

$$\underline{r}' = \sum_{k=1}^{K} A'^{(k)} \underline{d}^{(k)} + \underline{n} \qquad \text{Equation 9}$$

Equation 9 can be rewritten as Equation 10.

$$\underline{r}' = \sum_{k=1}^{K} H'^{(k)} C^{(k)} \underline{d}^{(k)} + \underline{n} \qquad \text{Equation 10}$$

$C^{(k)}$ is code sequence of the $k^{th}$ burst. $H'^{(k)}$ is the channel response for the $k^{th}$ sequence, which is defined for M multiple chip rate sampling per Equation 11.

$$H'^{(k)} = \begin{bmatrix} H_1^{(k)} \\ H_2^{(k)} \\ \vdots \\ H_M^{(k)} \end{bmatrix} \qquad \text{Equation 11}$$

When all the signal bursts in a time slot arise from the same user in the uplink or go to the same user in the downlink, the bursts pass through the same propagation path and, accordingly, the same fading channel. As a result, $H'^{(k)}$ is the same for all bursts ($H'^{(k)} = H'^{(j)} = H'_c$, for all k and j) and is replaced in Equation 10 with $H'_c$ as per Equation 12.

$$\underline{r}' = H'_c \sum_{k=1}^{K} C^{(k)} \underline{d}^{(k)} + \underline{n} \qquad \text{Equation 12}$$

Equation 13 is Equation 12 rewritten as a single matrix expression.

$$r' = H'_c C d + n \qquad \text{Equation 13}$$

C is the code matrix. For M chip rate sampling, $H'_c$ is per Equation 14.

$$H'_c = \begin{bmatrix} H_{c1} \\ H_{c2} \\ \vdots \\ H_{cM} \end{bmatrix} \qquad \text{Equation 14}$$

For an $m^{th}$ chip rate sample, $H_{cm}$ is the channel response for the $m^{th}$ sampled sequence. Each $H_{cm}$, m=1 . . . M, is determined by the channel estimation device 44, 50. The matrix structure of each $H_{cm}$ is per Equation 15, 52.

$$H_{cm} = \begin{bmatrix} h_{m,0} & 0 & & & & 0 \\ h_{m,1} & h_{m,0} & 0 & & & \\ h_{m,2} & h_{m,1} & \ddots & & & \\ \vdots & h_{m,2} & \ddots & & & \\ \vdots & \vdots & \ddots & & & \\ h_{m,W-3} & \vdots & & \ddots & 0 & \\ h_{m,W-2} & h_{m,W-3} & & & h_{m,0} & 0 \\ h_{m,W-1} & h_{m,W-2} & & & h_{m,1} & h_{m,0} \\ 0 & h_{m,W-1} & & & h_{m,2} & h_{m,1} \\ & 0 & \ddots & & \vdots & h_{m,2} \\ & & 0 & \ddots & \vdots & \vdots \\ & & & \ddots & h_{m,W-3} & \vdots \\ & & & \ddots & h_{m,W-2} & h_{m,W-3} \\ & & & 0 & h_{m,W-1} & h_{m,W-2} \\ 0 & & & & 0 & h_{m,W-1} \end{bmatrix} \qquad \text{Equation 15}$$

The overall signal model of data detection is represented as per Equations 16 and 17.

$$r' = H'_c s + n \qquad \text{Equation 16}$$

$$s = Cd \qquad \text{Equation 17}$$

s is the spread data chip vector. C is the code vector. One approach to determine s is to use a zero forcing (ZF) solution of Equation 16 as per Equation 18.

$$s = (H'^H_c H'_c)^{-1} H'^H_c r \qquad \text{Equation 18}$$

$H'^H_c$ is the hermitian of $H'_c$. Another approach is to use a minimum mean square error (MMSE) solution as per Equation 19.

$$s = (H'^H_c H'_c + \sigma^2 I)^{-1} H'^H_c r \qquad \text{Equation 19}$$

$\sigma^2$ is the noise variance. I is the identity matrix. After solving either Equation 17 or 18 for s, the solution of Equation 17 is obtained by despreading, as represented by Equation 20, 56.

$$d = C^H s \qquad \text{Equation 20}$$

The following approaches to solve Equations 18 and 19 for s use a fast fourier transform (FFT) decomposition of either a circulant approximation of the channel correlation matrix, R, or the channel response matrix, $H'_c$, 54. Using either matrix requires an approximation; however, using the channel response matrix, $H'_c$, also requires truncation of the last W−1 rows of the matrix to make it square. Accordingly, to eliminate degradation due to truncation, the channel correlation matrix, R, is preferably used.

A FFT decomposition of the channel correlation matrix, R, is performed as follows. For a ZF approach, R is defined as per Equation 21.

$$R = H'^H_c H'_c = \sum_{m=1}^{M} H^H_{cm} H_{cm} \qquad \text{Equation 21}$$

For a MMSE approach, R is defined as per Equation 22.

$$R = H'^H_c H'_c + \sigma^2 I \qquad \text{Equation 22}$$

The structure of the channel correlation matrix, R, is represented as per Equation 23.

$$R = \begin{bmatrix} R_0 & R_1 & \cdots & R_{W-1} & 0 & 0 & \cdots & & & & & 0 \\ R_1^* & R_0 & \ddots & & R_{W-1} & 0 & \ddots & & & & & \\ & R_1^* & \ddots & R_1 & & R_{W-1} & \ddots & 0 & & & & \\ R_{W-1}^* & & \ddots & R_0 & R_1 & & \ddots & 0 & 0 & & & \\ 0 & R_{W-1}^* & & R_1^* & R_0 & \ddots & & R_{W-1} & 0 & & & \\ 0 & 0 & \ddots & & R_1^* & \ddots & \ddots & & R_{W-1} & \ddots & 0 & \vdots \\ \vdots & 0 & \ddots & R_{W-1}^* & & \ddots & \ddots & R_1 & & \ddots & 0 & 0 \\ & & \ddots & 0 & R_{W-1}^* & & \ddots & R_0 & R_1 & & R_{W-1} & 0 \\ & & & 0 & 0 & R_{W-1}^* & & R_1^* & R_0 & \ddots & & R_{W-1} \\ & & & & 0 & 0 & \ddots & & R_1^* & \ddots & R_1 & \\ & & & & & 0 & \ddots & R_{W-1}^* & & \ddots & R_0 & R_1 \\ 0 & & & & & & \ddots & \cdots & 0 & 0 & R_{W-1}^* & \cdots & R_1^* & R_0 \end{bmatrix}$$

Equation 23

Equations 18 and 19 are rewritten in terms of R as per Equations 24 and 25, respectively.

$$s = R^{-1} H_c'^H r \quad \text{Equation 24}$$

$$Rs = H_c'^H r \quad \text{Equation 25}$$

The matrix-vector multiplication Rs can be viewed as a linear combination of column vectors of the channel correlation matrix, R, weighted by the corresponding elements of data chip vector s, as per Equation 26.

$$Rs = s_1 g_1 + s_2 g_2 + \ldots + s_W g_W + s_{W+1} g_{W+1} + \ldots + s_{N \cdot SF} \quad \text{Equation 26}$$

$g_i$ is the $i^{th}$ column of the channel correlation matrix R. $s_i$ is the $i^{th}$ element of spread data chip vector s.

By modifying the structure of matrix R, an optimum circulant matrix approximation of channel correlation matrix, $R_{cir}$, can be determined using Equation 27.

$$R_{cir} = \begin{bmatrix} R_0 & R_1 & \cdots & R_{W-1} & 0 & 0 & \cdots & 0 & 0 & \ddots & \vdots & R_1^* \\ R_1^* & R_0 & \ddots & & R_{W-1} & 0 & \ddots & & & \ddots & R_{W-1}^* & \vdots \\ & R_1^* & \ddots & R_1 & & R_{W-1} & \ddots & 0 & & & 0 & R_{W-1}^* \\ R_{W-1}^* & & \ddots & R_0 & R_1 & & \ddots & 0 & 0 & & & 0 \\ 0 & R_{W-1}^* & & R_1^* & R_0 & \ddots & & R_{W-1} & 0 & & & \\ 0 & 0 & \ddots & & R_1^* & \ddots & \ddots & & R_{W-1} & \ddots & 0 & \vdots \\ \vdots & 0 & \ddots & R_{W-1}^* & & \ddots & \ddots & R_1 & & \ddots & 0 & 0 \\ & & \ddots & 0 & R_{W-1}^* & & \ddots & R_0 & R_1 & & R_{W-1} & 0 \\ 0 & & & 0 & 0 & R_{W-1}^* & & R_1^* & R_0 & \ddots & \vdots & R_{W-1} \\ R_{W-1}^* & 0 & & & 0 & 0 & \ddots & & R_1^* & \ddots & R_1 & \vdots \\ \vdots & R_{W-1}^* & \ddots & & & 0 & \ddots & R_{W-1}^* & & \ddots & R_0 & R_1 \\ R_1 & \vdots & \ddots & 0 & 0 & \cdots & 0 & 0 & R_{W-1}^* & \cdots & R_1^* & R_0 \end{bmatrix}$$

Equation 27

The first column, q, has the full non-zero elements without any truncation. The circulant matrix, $R_{cir}$, is defined by its first column q. The first column q of circulant matrix, $R_{cir}$, is obtained by permuting the $W^{th}$ column $g_W$ of the channel correlation matrix, R, using the permutation operator or index vector as defined by Equation 28.

$$p = [W:N \cdot Q, 1:W-1] \quad \text{Equation 28}$$

Alternately, a circulant matrix is also defined by the $W^{th}$ column $g_W$ of channel correlation matrix, R. In general, any column greater than $W^{th}$ column may be used with a proper index vector (permutation vector).

This alternate approximate circulant channel correlation matrix, $R'_{cir}$, relates to $R_{cir}$ per Equation 29.

$$R'_{cir} = R_{cir}(:,p). \quad \text{Equation 29}$$

The advantage with this approach is that $g_W$ is used directly without permutation. However, the solved spread data chip vector s is required to be inverse permuted by the index vector $\bar{p}$ as per Equation 30.

By permuting the first row in the previous approach, the need for inverse permuting s is eliminated.

$$\bar{p} = [N \cdot SF - W + 2 : N \cdot SF, 1 : N \cdot SF - W + 1] \quad \text{Equation 30}$$

Equation 31 is the FFT decomposition of matrix $R_{cir}$.

$$R_{cir} = D_P^{-1} \Lambda_R D_P \quad \text{Equation 31}$$

$D_P$ is the P-point FFT matrix and $\Lambda_R$ is diagonal matrix, whose diagonal is the FFT of the first column of matrix $R_{cir}$. $\Lambda_R$ is defined as $\Lambda_R = \text{diag}(D_P q)$.

Using a FFT decomposition of the channel response matrix, $H'_c$, is performed as follows. Matched filtering, $H_c'^H r'$, is represented by Equation 32.

$$H_c'^H r' = \sum_{m=1}^{M} H_{cm}^H r_m \quad \text{Equation 32}$$

The channel response matrix that corresponds to each sampled sequence, $H_{cm}$, m=1,2, ..., M, are circulant matrixes. Each matrix can be decomposed into three FFT matrix multiplication as per Equation 33.

$$H_{cm} = D_P^{-1} \Lambda_{H_{cm}} D_P, m = 1 \ldots M \qquad \text{Equation 33}$$

As a result, the decomposition of the channel response matrix is per Equation 34.

$$H_c'^H \underline{r}' = D_P^{-1} \sum_{m=1}^{M} \Lambda_{H_{cm}}^* D_P \underline{r}_m \qquad \text{Equation 34}$$

To recover the data chip vector s, Equation 35 is used.

$$\hat{s} = R_{cir}^{-1} H_c'^H \underline{r}' = D_P^{-1} \Lambda_R^{-1} \sum_{m=1}^{M} \Lambda_{H_{cm}}^* D_P \underline{r}_m \qquad \text{Equation 35}$$

In the frequency domain, Equation 35 becomes Equation 36.

$$F(\underline{s}) = \frac{\sum_{m=1}^{M} F(\underline{h}_m)^* \otimes F(\underline{r}_m)}{F(\underline{q})} \qquad \text{Equation 36}$$

⊕ represents the operation of element by element multiplication. Using Equation 36, F(s) is determined. By taking the inverse transform of F(s), the spread data vector, s, is determined. If used for multi-user detection in the downlink or a single user solely uses one time slot in the uplink, s is despread by using all of the codes to recover the transmitted data d as soft symbols. If used for single user detection in the downlink, s is despread using that user's codes to recover that user's data as soft symbols. Hard decisions are made to convert the soft symbols to hard symbols.

Two approaches to implement the FFT composition are a prime factor algorithm (PFA) and a radix-2 algorithm. Although a PFA is considered more efficient than a radix-2 algorithm when a non-power-of-two number of FFT points is used, the following complexity analysis is based on a radix-2 FFT implementation for simplicity. The complexity based on radix-2 algorithm can be considered as the worst case. Additional improvement in complexity is obtainable when PFA is used. Zero-padding radix-2 FFT implementation entails the zero-padding the first column of $H_{cm}$, m=1 ... M, the vectors $r_m$, m=1 ... M and q. The zero-padding makes their length equal to the nearest radix-2 integer that is greater than or equal to the length of a data field. For example, the length of a data field is 976 chips for burst type 1 in a TDD burst specified by 3GPP W-CDMA standard. The nearest radix-2 integer of 976 is 1024 (P=1024). P is the radix-2 integer.

Four types of radix-2 FFT computations are required:

$$D_P \underline{r}_m, D_P \underline{h}_m, D_P \underline{g}_1 \text{ and } \frac{D_P(\cdot)}{P}.$$

Two of the computations are computed M times for all sampled sequences: $D_P r_m$, m=1 ... M and $D_P h_m$, m=1 ... M. The other two are performed only once for the sampled sequences. $D_P h_m$, m=1 ... M and $D_P g_1$ are computed once per time slot.

$$D_P \underline{r}_m, m = 1 \ldots M, \frac{D_P(\cdot)}{P}$$

are computed twice per time slot. As a result, a total of 3(M+1) radix-2 FFT computations are required. Each needs $P \log_2 P$ complex operations. By assuming each complex operation requires four real operations, the complexity for radix-2 FFT computations in terms of million real operations per second (MROPS) is per Equation 37.

$$C_1 = 3(M+1) P \log_2 P \cdot 4 \cdot 100 \cdot 10^{-6} MROPS \qquad \text{Equation 37}$$

For the complexity of the vector multiplications, there are M element-to-element vector multiplications and one element-to-element vector division, which are performed twice per time slot. As a result, the complexity for the vector operations in terms of MROPS is per Equation 38.

$$C_2 = 2(M+1) P \cdot 4 \cdot 100 \cdot 10^{-6} MROPS \qquad \text{Equation 38}$$

For the complexity of calculating the vector q, it requires $MW^2$ complex operations, which are performed once per time slot. The complexity in terms of MROPS is per Equation 39.

$$C_3 = MW^2 \cdot 4 \cdot 100 \cdot 10^{-6} MROPS \qquad \text{Equation 39}$$

The total complexity except for the despreading in MROPS is per Equation 40.

$$C_{fft} = C_1 + C_2 + C_3 MROPS \qquad \text{Equation 40}$$

Despreading is performed twice per time slot. The complexity of despreading in terms of MROPS is per Equation 41.

$$C_{desp} = 2 \cdot K \cdot N \cdot Q \cdot 4 \cdot 100 \cdot 10^{-6} MROPS \qquad \text{Equation 41}$$

As a result, the total complexity of the data detection including despreading is per Equations 42 or 43.

$$C_{Total} = C_{fft} + C_{desp} MROPS \qquad \text{Equation 42}$$

$$C_{Total} = [3(M+1) P \log_2 P + 2(M+1) P + MW^2 + 2KNQ] \cdot 4 \cdot 100 \cdot 10^{-6} MROPS \qquad \text{Equation 43}$$

The following tables show the complexity in MROPS for a 1024-point radix-2 (P=1024) computation. Complexity is shown in Tables 1 at the chip rate and at Table 2 at twice the chip rate sampling. A complexity comparison is made in MROPS between BLE-JD using approximate Cholesky decomposition and low complexity data detection, as shown in Tables 3 and 4. Table 5 is a complexity comparison showing the complexity of low complexity data detection as a percentage of the complexity of BLE-JD using approximate Cholesky decomposition. As shown, low complexity data detection has a much lower complexity than approximate Cholesky based BLE-JD. Depending on the number of bursts transmitted and spreading factors, for most cases, low complexity data detection is 25% at the chip rate, and 30% at twice the chip rate, of the complexity of approximate Cholesky based BLE-JD.

TABLE 1

MROPS of a full-burst using low complexity data detection for burst type 1 at chip rate sampling.

| | Funcs Executed once per burst | | | Funcs executed twice per half-burst | | | |
| --- | --- | --- | --- | --- | --- | --- | --- |
| # of bursts, K | Construct $\underline{q}$ | Compute $D_P\underline{h}_m$ $m = 1 \ldots M$ via Radix-2 FFT | Compute $D_P\underline{g}_1$ Via Radix-2 FFT | Compute $D_P\underline{r}_m$ $M = 1 \ldots M$ Via Radix-2 FFT | Compute $\frac{D_P(\cdot)}{P}$ Via Radix-2 FFT | Despread $C^{(k)H}\underline{s}$ | Total |
| 1 | 1.3 | 4.1 | 4.1 | 8.2 | 8.2 | 0.78 | 26.7 |
| 8 | 1.3 | 4.1 | 4.1 | 8.2 | 8.2 | 6.25 | 32.2 |
| 12 | 1.3 | 4.1 | 4.1 | 8.2 | 8.2 | 9.4 | 35.3 |
| 13 | 1.3 | 4.1 | 4.1 | 8.2 | 8.2 | 10.1 | 36 |
| 14 | 1.3 | 4.1 | 4.1 | 8.2 | 8.2 | 10.9 | 36.8 |
| 16 | 1.3 | 4.1 | 4.1 | 8.2 | 8.2 | 12.5 | 38.4 |

TABLE 2

MROPS of a full-burst using low complexity data detection for burst type 1 and twice the chip rate sampling.

| | Funcs Executed once per burst | | | Funcs executed twice per half-burst | | | |
| --- | --- | --- | --- | --- | --- | --- | --- |
| # of bursts, K | Construct $\underline{q}$ | Compute $D_P\underline{h}_m$ $m = 1 \ldots M$ via Radix-2 FFT | Compute $D_P\underline{g}_1$ Via Radix-2 FFT | Compute $D_P\underline{r}_m$ $M = 1 \ldots M$ Via Radix-2 FFT | Compute $\frac{D_P(\cdot)}{P}$ Via Radix-2 FFT | Despread $C^{(k)H}\underline{s}$ | Total |
| 1 | 2.6 | 8.2 | 8.2 | 16.4 | 16.4 | 0.78 | 52.6 |
| 8 | 2.6 | 8.2 | 8.2 | 16.4 | 16.4 | 6.25 | 58.1 |
| 12 | 2.6 | 8.2 | 8.2 | 16.4 | 16.4 | 9.4 | 61.2 |
| 13 | 2.6 | 8.2 | 8.2 | 16.4 | 16.4 | 10.1 | 61.9 |
| 14 | 2.6 | 8.2 | 8.2 | 16.4 | 16.4 | 10.9 | 62.7 |
| 16 | 2.6 | 8.2 | 8.2 | 16.4 | 16.4 | 12.5 | 64.3 |

TABLE 3

Comparison in MROPS between BLE-JD (approximate Cholesky decomposition) and low complexity data detection at chip rate sampling.

| Spreading Factor, Q | # of bursts, K | Proposed algorithm | BLE-JD |
| --- | --- | --- | --- |
| 1 | 1 | 26.7 | 318.2 |
| 16 | 8 | 32.2 | 81.1 |
| | 12 | 35.3 | 174.6 |
| | 13 | 36 | 205.5 |
| | 14 | 36.8 | 239.4 |
| | 16 | 38.4 | 318.2 |

TABLE 4

Comparison in MROPS between BLE-JD (approximate Cholesky decomposition) and low complexity data detection at twice the chip rate sampling.

| Spreading Factor, Q | # of bursts, K | Proposed algorithm | BLE-JD |
| --- | --- | --- | --- |
| 1 | 1 | 52.6 | 427.6 |
| 16 | 8 | 58.1 | 124.8 |
| | 12 | 61.2 | 248.3 |
| | 13 | 61.9 | 287.7 |
| | 14 | 62.7 | 330.4 |
| | 16 | 64.3 | 427.6 |

TABLE 5

Complexity of FFT of the channel correlation matrix as a percentage of the complexity of approximate Cholesky based BLE-JD. Approximate Cholesky based BLE-JD is set at 100% complexity.

| Spreading Factor, Q | # of bursts, K | Chip rate sampling | Twice the chip rate sampling |
| --- | --- | --- | --- |
| 1 | 1 | 8% | 12% |
| 16 | 8 | 39% | 47% |
| | 12 | 20% | 25% |
| | 13 | 18% | 22% |
| | 14 | 15% | 19% |
| | 16 | 12% | 15% |

FIGS. 5–15 are graphs of the performance of low complexity data detection. Two high date rate services are simulated. One is single-code transmission with SF=1 and the other is multi-code transmission with twelve codes and spreading factor 16 for each. Low complexity data detection is tested under various delay spread types including 3GPP working group four (WG4) defined delay spread channel cases 1, 2 and 3. The simulations are set for both chip rate and twice the chip rate sampling. The length of delay spread is assumed W=57. Zero timing error is assumed through the whole simulations. The channel impulse response is assumed to be exactly known. In general, the bit error rate (BER) performance of the multi-code case is better than its corresponding single-code counterpart in the simulation. For the particular example used in the simulation, single-code transmission uses 16 resource units per time slot while the multi-code transmission uses only 12 resource units in each time slot. Using only 12 codes produces less interference and therefore better BER. As compared with BLE-JD, only little or limited performance degradation are observed for proposed algorithm based on FFT decomposition of the channel correlation matrix (FFT-R) in both single-code and multi-code cases. In single-code case, the FFT-R based approach is identical to the block linear equalization structure. The proposed FFT-R based approach and the approach based on FFT of the channel response matrix (FFT-H) are identical to each other at the chip rate sampling.

The performance of low complexity data detection using FFT-R and FFT-H is compared to an ideal single user bond, a worst case matched filtering, BLE-JD and single user detection with BLE using an approximate Cholesky decomposition. For the working points of interest, the BER range was typically between 1% and 10%. Only a little or limited signal to noise ratio (SNR) performance degradations are observed for low complexity data detection as compared with BLE-JD, and significant SNR performance enhancement over matched filtering (MF). Low complexity data detection also performs well in an additive white gaussian noise (AWGN) channel environment. FIGS. 5–15 show that low complexity data detection offers very comparable performance in BER or SNR at much lower complexity and power consumption as compared to BLE-JD using approximate Cholesky decomposition.

What is claimed is:

1. A circuit for use in a receiver that receives a plurality of code division multiple access data signals simultaneously, each data signal experiencing a similar channel response, the circuit comprising:
   an input for receiving the plurality of data signals;
   a channel estimator for estimating the similar channel response at a multiple of a chip rate of the combined signal; and
   a data detector for constructing a channel response matrix representing a channel of the data signals based in part on the estimated channel response, determining a spread data vector based in part on a fast Fourier transform (FFT) decomposition of a circulant version of the channel response matrix, and despreading the spread data vector to recover data from the received data signals.

2. The circuit of claim 1 wherein the multiple of the chip rate is twice the chip rate.

3. A circuit for use in a receiver that receives a plurality of code division multiple access data signals simultaneously, each data signal experiencing a similar channel response, the circuit comprising:
   an input for receiving the plurality of data signals;
   a channel estimator for estimating the similar channel response; and
   a data detector for constructing a channel correlation matrix representing a channel of the data signals based in part on the estimated channel response, determining a spread data vector based in part on a fast Fourier transform (FFT) decomposition of a circulant version of the channel correlation matrix, and despreading the spread data vector to recover data from the received data signals.

4. The circuit of claim 3 wherein the combined signal is sampled at a multiple of a chip rate of the combined signal and the sampled combined signal is input into the channel estimator and data detector.

5. The circuit of claim 4 wherein the multiple of the chip rate is twice the chip rate.

6. The circuit of claim 3 wherein the combined signal is sampled at a chip rate of the combined signal and the sampled combined signal is input into the channel estimator and data detector.

7. The circuit of claim 3 wherein the FFT decomposition is performed using a permuted first row of the channel correlation matrix.

8. The circuit of claim 3 wherein the FFT decomposition is performed using a defining row of the channel correlation matrix.

* * * * *

UNITED STATES PATENT AND TRADEMARK OFFICE
CERTIFICATE OF CORRECTION

PATENT NO. : 7,054,300 B2
APPLICATION NO. : 11/100901
DATED : May 30, 2006
INVENTOR(S) : Pan et al.

It is certified that error appears in the above-identified patent and that said Letters Patent is hereby corrected as shown below:

IN THE ABSTRACT

At section (57), page 1, right column, line 11, after the words "on a", delete "fast Fourier transform" and insert therefor --Fast Fourier Transform--.

IN THE DRAWINGS

At FIG. 4, item 54, line 2, after the word "PART", delete "A" and insert therefor --AN--.

Figure 11:
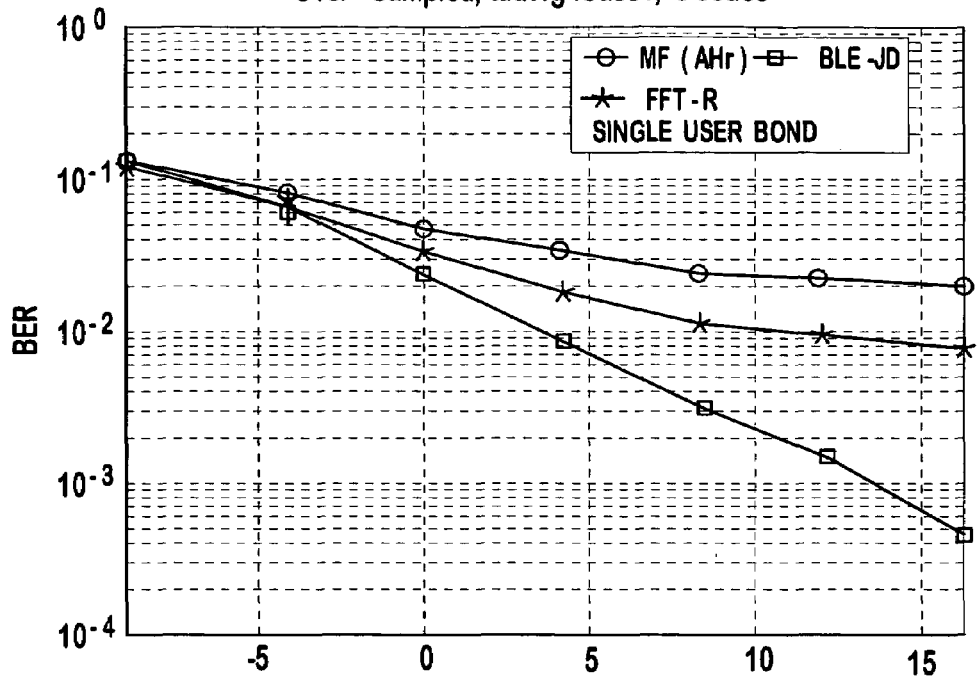
Figure 12:
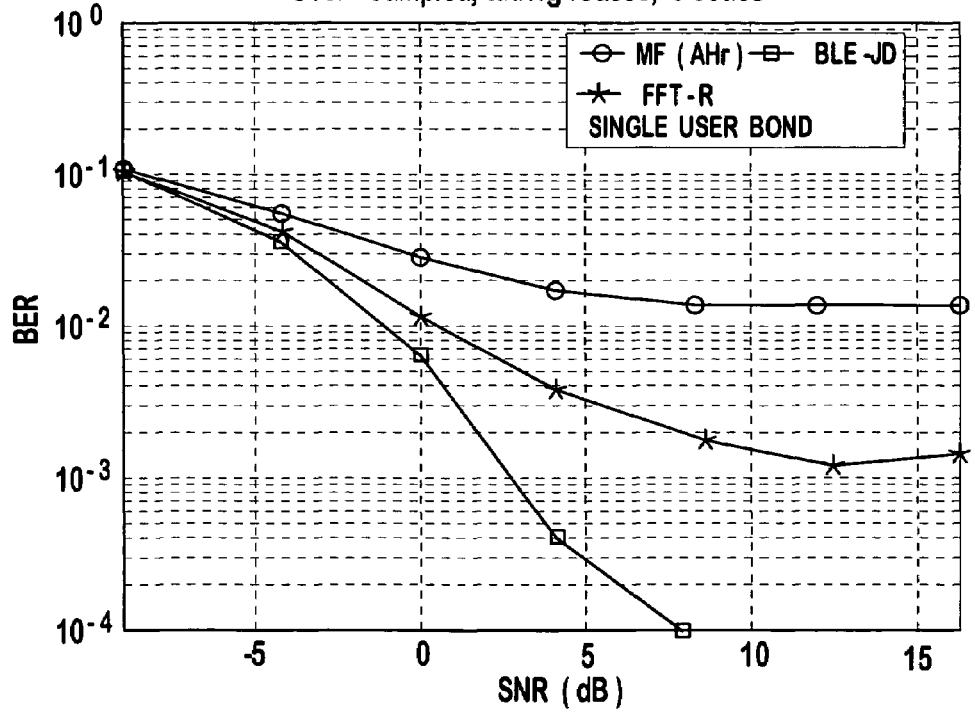
Figure 13:
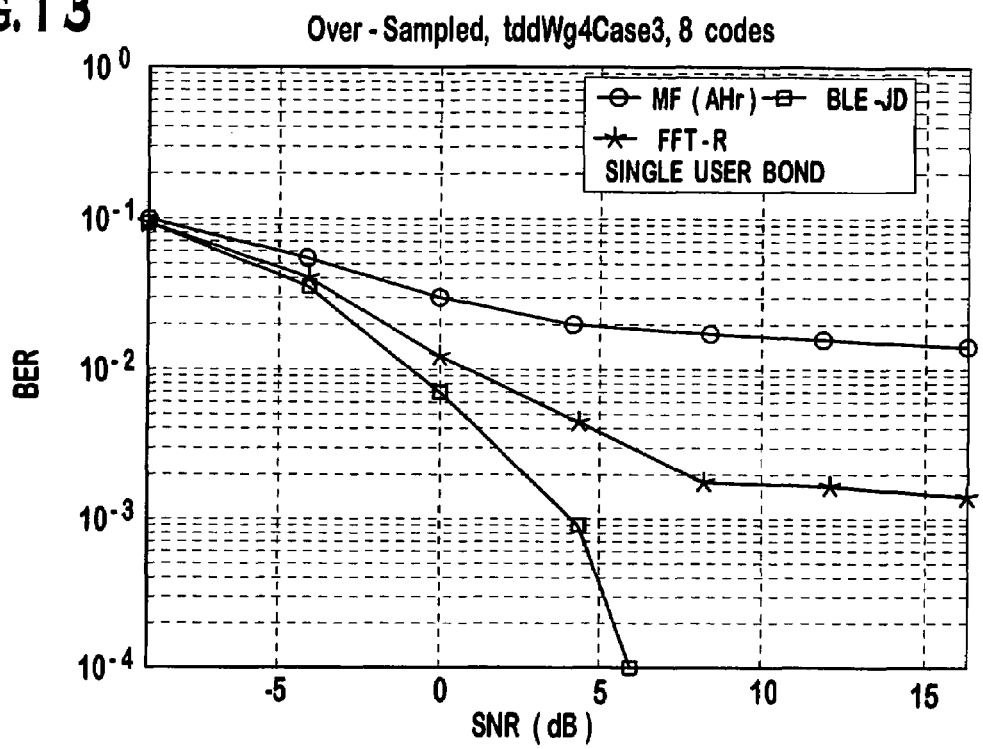
Figure 14:
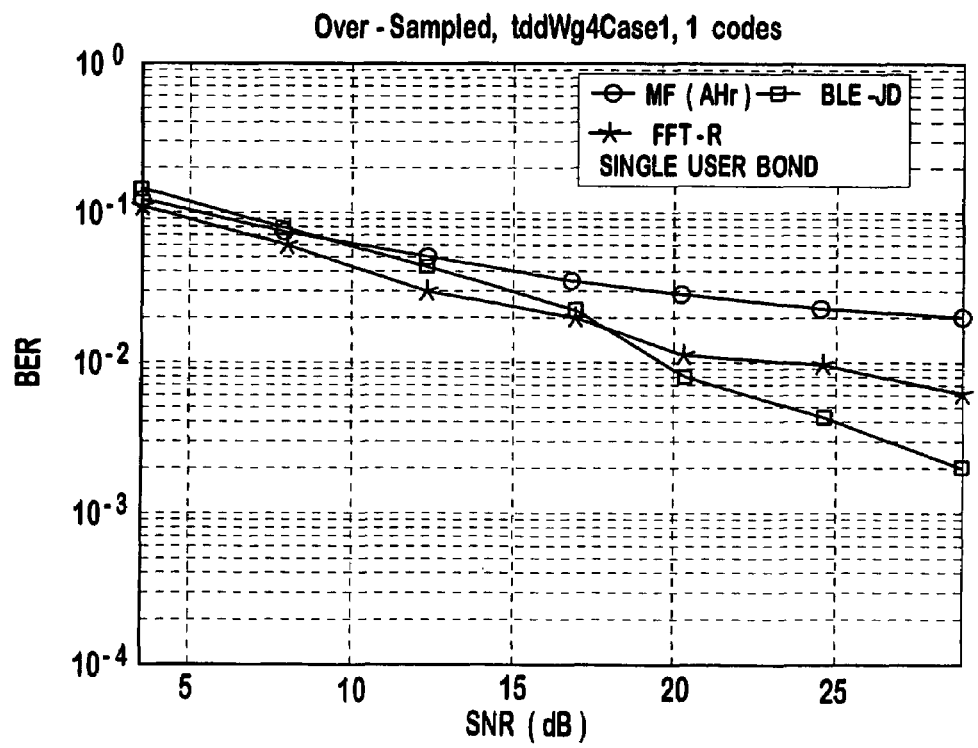
Figure 15:
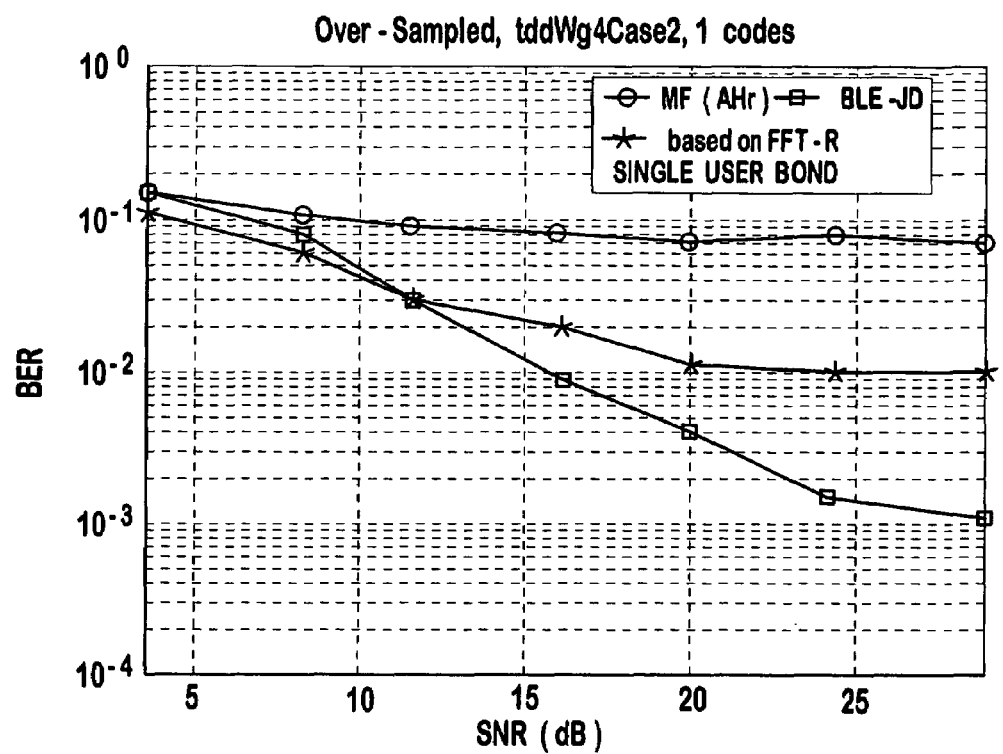

At FIG. 11, horizontal axis, insert --SNR (dB)--.

IN THE SPECIFICATION

At column 2, line 4, after the words "on a", delete "fast Fourier transform" and insert therefor --Fast Fourier Transform--.

At column 2, line 56, after the words "or an", delete "N-ary" and insert therefor --M-ary--.

At column 3, line 28, after the word "response", delete "$h^{(k)}$" and insert therefor --$\underline{h}^{(k)}$--.

At column 3, line 31, after the word "each", delete "$h^{(k)}$" and insert therefor --$\underline{h}^{(k)}$--.

At column 3, line 34, after the words "the same", delete "$h^{(k)}$" and insert therefor --$\underline{h}^{(k)}$--.

At column 3, line 35, after the word "vector", delete "r" and insert therefor --$\underline{r}$--.

At column 3, line 37, after the words "the same", delete "$h^{(k)}$" and insert therefor --$\underline{h}^{(k)}$--.

At column 3, line 42, after the word "response", delete "$s^{(k)}$" and insert therefor --$\underline{s}^{(k)}$--.

At column 3, line 43 after the word "with", delete "$h^{(k)}$" and insert therefor --$\underline{h}^{(k)}$--.

At column 3, line 43, after the word "Accordingly", delete "$s^{(k)}$" and insert therefor --$\underline{s}^{(k)}$--.

At column 3, line 47, before the words "is the", delete "$d^{(k)} \cdot r^{(k)}$" and insert therefor --$\underline{d}^{(k)} \cdot \underline{r}^{(k)}$--.

UNITED STATES PATENT AND TRADEMARK OFFICE
CERTIFICATE OF CORRECTION

PATENT NO.       : 7,054,300 B2
APPLICATION NO.  : 11/100901
DATED            : May 30, 2006
INVENTOR(S)      : Pan et al.

It is certified that error appears in the above-identified patent and that said Letters Patent is hereby corrected as shown below:

At column 3, line 48, after the word "vector", delete "r·d$^{(k)}$" and insert therefor --$\underline{r}\cdot\underline{d}^{(k)}$--.

At column 3, line 49, before the word "and", delete "d$^{(k)}$" and insert therefor --$\underline{d}^{(k)}$--.

At column 3, line 49, after the word "and", delete "r$^{(k.)}$" and insert therefor --$\underline{r}^{(k)}$--.

At column 3, line 51, delete Equation 1, and insert therefor --$\underline{r}^{(k)} = A^{(k)}\,\underline{d}^{(k)}$, where k=1, ..., K--.

At column 3, line 54, after the words "element of", delete "d$^{(k)}$" and insert therefor --$\underline{d}^{(k)}$--.

At column 3, line 55, after the word "support", delete "s$^{(k)}$" and insert therefor --$\underline{s}^{(k)}$--.

At column 3, line 66, before the words "is a", delete "n" and insert therefor --$\underline{n}$--.

At column 4, line 4, delete Equation 3 and insert therefor --$\underline{r} = A\,\underline{d} + \underline{n}$--.

At column 4, line 7, before the words "is the", delete "d" and insert therefor --$\underline{d}$--.

At column 4, line 10, after the word "vector", delete "r" and insert therefor --$\underline{r}$--.

At column 4, line 23, after the word "response", delete "h$_m^{(k)}$" and insert therefor --$\underline{h}_m^{(k)}$--.

At column 4, line 24, after the word "sequence", delete "r$_m^{(k)}$" and insert therefor --$\underline{r}_m^{(k)}$--.

At column 4, line 25, after the words "chip vector", delete "r$_m$" and insert therefor --$\underline{r}_m^{(k)}$--.

At column 4, line 25, after the words "symbol vector", delete "d$^{(k)}$" and insert therefor --$\underline{d}^{(k)}$--.

At column 4, line 26, after the word "vector", delete "r$_m^{(k)}$" and insert therefor --$\underline{r}_m^{(k)}$--.

At column 4, line 30, delete Equation 4, and insert therefor
--$\underline{r}_m^{(k)} = A_m^{(k)}\,\underline{d}_m^{(k)}$, k=1, ... ,K, m=1 ... M--.

At column 4, line 34, after the words "element of", delete "d$^{(k)}$" and insert therefor --$\underline{d}^{(k)}$--.

UNITED STATES PATENT AND TRADEMARK OFFICE
CERTIFICATE OF CORRECTION

PATENT NO. : 7,054,300 B2  
APPLICATION NO. : 11/100901  
DATED : May 30, 2006  
INVENTOR(S) : Pan et al.

It is certified that error appears in the above-identified patent and that said Letters Patent is hereby corrected as shown below:

At column 4, line 35, after the word "vector", delete "$r_m$" and insert therefor --$\underline{r}_m$--.

At column 4, line 47, delete Equation 6, and insert therefor --$\underline{r}' = A'\underline{d} + \underline{n}$--.

At column 4, line 48, before the words "is the", delete "r'" and insert therefor --$\underline{r}'$--.

At column 5, line 50, delete Equation 13 and insert therefor --$\underline{r}' = H_c'C\underline{d} + \underline{n}$--.

At column 5, line 67, after "15", delete "52" and insert therefor --52--.

At column 6, line 24, delete Equation 16, and insert therefor --$\underline{r}' = H'_c \underline{s} + \underline{n}$--.

At column 6, line 26, delete Equation 17, and insert therefor --$\underline{s} = C\underline{d}$--.

At column 6, line 28, before the words "is the", delete "s" and insert therefor --$\underline{s}$--.

At column 6, line 29, after the word "determine", delete "s" and insert therefor --$\underline{s}$--.

At column 6, line 32, delete Equation 18, and insert therefor --$\underline{s} = (H'^H_c H'_c)^{-1} H'^H_c \underline{r}$--.

At column 6, line 33, after the words "is the", delete "hermitian" and insert therefor --Hermitian--.

At column 6, line 37, delete Equation 19, and insert therefor --$\underline{s} = (H'^H_c H'_c + \sigma^2 I)^{-1} H'^H_c \underline{r}$--.

At column 6, line 39, after the word "for", delete "s," and insert therefor --$\underline{s}$,--.

At column 6, line 41, after "20.", delete "56" and insert therefor --56--.

At column 6, line 42, delete Equation 20 and insert therefor --$\underline{d} = C^H \underline{s}$--.

At column 6, line 45, after the word "for", delete "s use a fast fourier transform" and insert therefor --$\underline{s}$ use a Fast Fourier Transform--.

At column 6, line 47, before the word "Using", delete "54" and insert therefor --54--.

At column 6, line 54, before "FFT", delete "A" and insert therefor --An--.

At column 6, line 63, before "MMSE", delete "a" and insert therefor --an--.

UNITED STATES PATENT AND TRADEMARK OFFICE
CERTIFICATE OF CORRECTION

PATENT NO. : 7,054,300 B2
APPLICATION NO. : 11/100901
DATED : May 30, 2006
INVENTOR(S) : Pan et al.

It is certified that error appears in the above-identified patent and that said Letters Patent is hereby corrected as shown below:

At column 7, line 21, delete Equation 24, and insert therefor --$\underline{s} = R^{-1} {H'_c}^H \underline{r}$--.

At column 7, line 24, delete Equation 25, and insert therefor --$R\underline{s} = {H'_c}^H \underline{r}$--.

At column 7, line 25, after the word "multiplication", delete "Rs" and insert therefor --$R\underline{s}$--.

At column 7, line 28, after the word "vector", delete "s" and insert therefor --$\underline{s}$--.

At column 7, line 29, delete Equation 26, and insert therefor

-- $R_{\underline{s}} = S_1 \underline{g}_1 + S_2 \underline{g}_2 + \ldots + S_W \underline{g}_W + S_{W+1} \underline{g}_{W+1} + \ldots + S_{N \cdot SF} \underline{g}_{N \cdot SF}$ --

At column 7, line 30, before the words "is the", delete "$g_i$" and insert therefor --$\underline{g}_i$--

At column 7, line 31, after the word "vector", delete "s" and insert therefor --$\underline{s}$--.

At column 7, line 55, after the word "column", delete "q" and insert therefor -- $\underline{q}$ --.

At column 7, line 57, after the words "its first column", delete "q" and insert therefor --$\underline{q}$ --.

At column 7, line 57, after the words "The first column", delete "q" and insert therefor --$\underline{q}$ --.

At column 7, line 58, after the word "column", delete "$g_w$" and insert therefor --$\underline{g}_w$--.

At column 7, line 62, delete Equation 28, and insert therefor -- $\underline{p} = [W:N\cdot Q, 1:W-1]$--.

At column 7, line 65, after the word "column", delete "$g_w$" and insert therefor --$\underline{g}_w$--.

At column 8, line 22, delete Equation 29, and insert therefor --$R'_{cir} = R_{cir}(:,\underline{p})$.--.

At column 8, line 23, after the words "is that", delete "$g_w$" and insert therefor --$\underline{g}_w$--.

At column 8, line 25, after the word "vector", delete "s" and insert therefor --$\underline{s}$--.

At column 8, line 26, after the word "vector", delete "$\overline{p}$" and insert therefor --$\overline{\underline{p}}$--

At column 8, line 29, after the word "permuting" delete "s" and insert therefor--$\underline{s}$--.

UNITED STATES PATENT AND TRADEMARK OFFICE
CERTIFICATE OF CORRECTION

| | |
|---|---|
| PATENT NO. | : 7,054,300 B2 |
| APPLICATION NO. | : 11/100901 |
| DATED | : May 30, 2006 |
| INVENTOR(S) | : Pan et al. |

It is certified that error appears in the above-identified patent and that said Letters Patent is hereby corrected as shown below:

At column 8, line 31, delete Equation 30, and insert therefor
--$\underline{p}$ = [N·SF - W + 2:N·SF,1:N·SF - W + 1]--.

At column 8, line 57, after the words "defined as", delete "$\Lambda_R$=diag($D_p$q)." and insert therefor --$\Lambda_R = diag(D_p \underline{q})$.--.

At column 8, line 59, before "FFT", delete "a" and insert therefor --an--.

At column 8, line 61, before the words "is represented", delete "$H'^H_c r'$ " and insert therefor -- $H'^H_c \underline{r}'$--.

At column 9, line 15, after the word "vector", delete "s" and insert therefor --$\underline{s}$--.

At column 9, line 33, after the words "Equation 36", delete "F(s)" and insert therefor -- F($\underline{s}$)--.

At column 9, line 34, after the words "transform of", delete "F(s)" and insert therefor -- F($\underline{s}$)--.

At column 9, line 34, after the word "vector", delete "s" and insert therefor --$\underline{s}$--.

At column 9, line 36, after the word "uplink", delete "s" and insert therefor --$\underline{s}$--.

At column 9, line 38, after the word "data", delete "d" and insert therefor --$\underline{d}$--.

At column 9, line 39, after the word "downlink", delete "s" and insert therefor --$\underline{s}$--.

At column 9, line 52, after the word "vectors" delete "$r_m$" and insert therefor --$\underline{r}_m$--.

At column 9, line 52, after "M and" delete "q" and insert therefor --$\underline{q}$--.

At column 9, line 67, after the word "sequences:", delete "$D_p r_m$, m=1 ... M and $D_p h_m$, m=1 ..." and insert therefor -- $D_p \underline{r}_m$, m=1 ... M and $D_p \underline{h}_m$, m=1 ...-- .

At column 10, line 2, after the word "sequences.", delete "$D_p h_m$, m=1 ... M and $D_p g_1$" and insert therefor -- $D_p \underline{h}m$, m=1 ... M and $D_p \underline{g}_1$ --.

At column 10, line 27, after the word "vector" delete "q" and insert therefor --$\underline{q}$--.

At column 11, Table 1, column 3, line 10, delete "via" and insert therefor --Via--.

UNITED STATES PATENT AND TRADEMARK OFFICE
CERTIFICATE OF CORRECTION

PATENT NO. : 7,054,300 B2
APPLICATION NO. : 11/100901
DATED : May 30, 2006
INVENTOR(S) : Pan et al.

It is certified that error appears in the above-identified patent and that said Letters Patent is hereby corrected as shown below:

At column 11, Table 1, column 5, line 9, delete "M = 1 ... M" and insert therefor --m = 1 ... M--.

At column 11, Table 2, column 3, line 10, delete "via" and insert therefor --Via--.

At column 11, Table 2, column 5, line 9, delete "M = 1 ... M" and insert therefor --m = 1 ... M--.

At column 12, line 56, after the word "high", delete "date" and insert therefor --data--.

IN THE CLAIMS

At claim 1, column 14, lines 2 & 3, after the words "on a", delete "fast Fourier transform" and insert therefor --Fast Fourier Transform--.

At claim 3, column 14, lines 19 & 20, after the words "on a", delete "fast Fourier transform" and insert therefor --Fast Fourier Transform--.

Signed and Sealed this

Sixteenth Day of January, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,054,300 B2 |
| APPLICATION NO. | : 11/100901 |
| DATED | : May 30, 2006 |
| INVENTOR(S) | : Pan et al. |

It is certified that error appears in the above-identified patent and that said Letters Patent is hereby corrected as shown below:

At column 1, line 21 after the word "has", delete "base stations" and insert therefor --user equipments (UEs)--.

Signed and Sealed this

Third Day of November, 2009

David J. Kappos
*Director of the United States Patent and Trademark Office*